United States Patent
Kikta et al.

(10) Patent No.: US 8,108,745 B2
(45) Date of Patent: Jan. 31, 2012

(54) ON-DEVICE CONSTRAINED RANDOM VERIFICATION FOR DEVICE DEVELOPMENT

(75) Inventors: Timothy J. Kikta, Tarpon Springs, FL (US); Lucas Roosevelt, Trinity, FL (US); Eric R. Schneider, Lexington, MA (US)

(73) Assignee: Honeywell International Inc., Morristown, NJ (US)

( * ) Notice: Subject to any disclaimer, the term of this patent is extended or adjusted under 35 U.S.C. 154(b) by 303 days.

(21) Appl. No.: 12/544,722

(22) Filed: Aug. 20, 2009

(65) Prior Publication Data

US 2011/0047428 A1   Feb. 24, 2011

(51) Int. Cl.
   *G06F 11/00* (2006.01)
(52) U.S. Cl. ........................... 714/736; 714/733
(58) Field of Classification Search ............... 365/201; 714/733, 724, 718, 738, 736; 716/108, 136
See application file for complete search history.

(56) References Cited

U.S. PATENT DOCUMENTS

| | | | |
|---|---|---|---|
| 6,182,258 B1 | 1/2001 | Hollander | |
| 6,564,349 B1 * | 5/2003 | Mitten et al. ................ | 714/733 |
| 6,928,638 B2 | 8/2005 | Parvathala et al. | |
| 6,934,205 B1 * | 8/2005 | Pandey et al. ............... | 365/201 |
| 6,948,096 B2 | 9/2005 | Parvathala et al. | |
| 7,213,185 B2 * | 5/2007 | Barone et ..................... | 714/733 |
| 7,231,621 B1 * | 6/2007 | Herron et al. ................ | 716/108 |
| 7,284,177 B2 | 10/2007 | Hollander et al. | |
| 7,406,670 B1 * | 7/2008 | Ansari et al. ................ | 716/136 |
| 7,421,635 B2 * | 9/2008 | Shin et al. ..................... | 714/733 |
| 7,818,645 B2 * | 10/2010 | Gedamu et al. .............. | 714/733 |

OTHER PUBLICATIONS

"Automated, Coverage-Driven Verification IP", "http://www.verisity.com/products/pdf/axi.pdf", 2004, Publisher: Verisity Ltd.
Chen, Jason C., "Applying CRV to Microprocessors", "EETimes-India", Dec. 2007, Publisher: eetindia.com.
Shen, Jian; Abraham, Jacob A., "Native Mode Function Test Genderation for Processors With Applications to Self Test and Design Validation", "Proceedings of the 1998 IEEE International Test Conference", Jul. 16, 1998, Publisher: IEEE Computer Society, Published in: Washington DC.

* cited by examiner

*Primary Examiner* — David Ton
(74) *Attorney, Agent, or Firm* — Fogg & Powers LLC (57) ABSTRACT

A method of functionally verifying a device under test having at least one processor and at least one memory is disclosed. The method includes creating verification data for the device under test using a constrained random verification data creation process executed on the at least one processor. The verification data includes input data and expected output data. The method further includes storing the verification data in the at least one memory. The method further includes processing the input data with the at least one processor to produce actual output data. The method further includes comparing the actual output data to the expected output data. When the actual output data does not equal the expected output data, the method further includes storing at least one inconsistency between the actual output data and the expected output data.

20 Claims, 4 Drawing Sheets

ON-DEVICE CONSTRAINED RANDOM VERIFICATION FOR DEVICE DEVELOPMENT

BACKGROUND

Proper operation of electronic circuits is always desirable and is particularly important in mission critical applications. Electronic circuits are implemented in a variety of embodiments, including but not limited to printed circuit assemblies ("PCAs") and integrated circuits ("ICs"). Electronic circuits are typically designed using either a schematic capture tool or a Hardware Description Language ("HDL"), such as the Very High Speed integrated Circuit HDL ("VHDL"), the Verilog HDL, or the SystemVerilog Hardware Description and Verification Language ("HDVL"). The field of Electronic Design Automation ("EDA") encompasses software tools for designing, producing, and verifying electronic circuits and devices. These software tools describe electronic circuits at various levels of abstraction, such as at the electronic component, transistor, gate, or register transfer level ("RTL") levels. Electronic circuits described at the electronic component level may include passive and/or active discrete components, integrated circuits, and hybrid circuits. Passive discrete components may include resistors, capacitors, inductors, and diodes. Active discrete components may include transistors, diodes, and LEDs.

During the development of an electronic circuit, various procedures are often used to verify and test the proper operation of the electronic circuit. The development of an electronic circuit is typically broken up into two parts, a design phase followed by a manufacturing phase. During the design phase of an electronic circuit, "verification" is used to verify the correct design of the electronic circuit. During the subsequent manufacturing phase of the electronic circuit, "testing" of manufactured devices is used to test that the manufactured hardware is being correctly fabricated according to the earlier verified design. During both verification and testing, tests are performed on the electronic circuit. The electronic circuit being verified and tested is typically referred to as the "device under verification" ("DUV") during the development and verification phase and the "device under test" ("DUT") during the manufacturing and testing phase. For simplicity, the device being verified and tested will be referred to here as the "device under test".

The device can be verified at several stages of the design process. First, the device can be verified while the electronic circuit is in the schematic/HDL design stage. Verification during this stage is typically implemented using schematic/HDL simulation. During schematic/HDL simulation verification, a simulation model of the device is created in software. The simulation model of the device is provided with various input stimulus and the output of the device is analyzed. Additionally, values of electronic signals flowing through the simulation model of the device may be monitored during verification of the simulation model of the device.

Second, a physical device can be verified after it is fabricated. It is typically more difficult to monitor values of electronic signals flowing through the physical device than to monitor values of electronic signals flowing through the simulation model of the device. The physical device typically runs faster than the simulated device, complicating the verification of the actual device. In other examples, the actual device does not run faster than the simulated device.

During both software simulation verification and actual hardware verification, specific directed tests are typically written to test for potential problems in the device under test. Directed tests are typically written by hardware designers to verify specific aspects of the design of the device under test. Directed tests are typically written to test boundary cases, such as verification of proper usage of the lowest memory address of the device under test, proper usage of the highest memory address of the device under test, and proper usage and manipulation of some alternating binary ones and zeros, such as a repeating string of the number "5" and the letter "A".

Though directed tests are helpful in checking for specific errors, it is difficult and time consuming to develop sufficient directed tests to thoroughly verify an electronic circuit design. In addition, if the design of the electronic circuit changes, new directed tests are typically required to adequately test the revised circuit design. Typically, many variables can affect the operation of an electronic circuit. It can be difficult for designers to thoroughly test every combination of these variables using only directed tests. Directed tests can be implemented in simulation, in actual physical hardware, or in hardware emulation.

Constrained random verification is sometimes used to verify electronic circuits in addition to, or instead of, directed tests. During constrained random verification, a series of random verification tests are typically generated using a hardware architecture description of the device under test and a plurality of constraints. The plurality of constraints set boundaries on the random verification tests that are generated. The generated tests are then executed on the device under test. The generated tests are designed to vigorously verify the device under test. As with directed tests, constrained random verification can be implemented in simulation, in actual hardware, or in hardware emulation.

Ideally, constrained random verification is used in the schematic/HDL simulation environment to exhaustively verify hardware in more than simple corner cases. Budget and schedule limitations prevent some hardware developers from taking advantage of schematic/HDL simulations using constrained random verification. These schematic/HDL simulations using constrained random verification are typically costly and can sometimes take days or weeks to run, depending on the design and complexity of the hardware and tests. Thus, some developers go straight from programming in a schematic capture tool or a HDL to implementing the physical circuits, bypassing simulation based verification altogether. These developers have limited options for verification in the hardware stage and will typically write some tests in the native language of the electronic circuit. These tests are typically difficult and time consuming to write. Thus, the tests do not typically go beyond verifying corner cases.

SUMMARY

A method of functionally verifying a device under test having at least one processor and at least one memory is disclosed. The method includes creating verification data for the device under test using a constrained random verification data creation process executed on the at least one processor. The verification data includes input data and expected output data. The method further includes storing the verification data in the at least one memory. The method further includes processing the input data with the at least one processor to produce actual output data. The method further includes comparing the actual output data to the expected output data. When the actual output data does not equal the expected output data, the method further includes storing at least one inconsistency between the actual output data and the expected output data.

The details of various embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
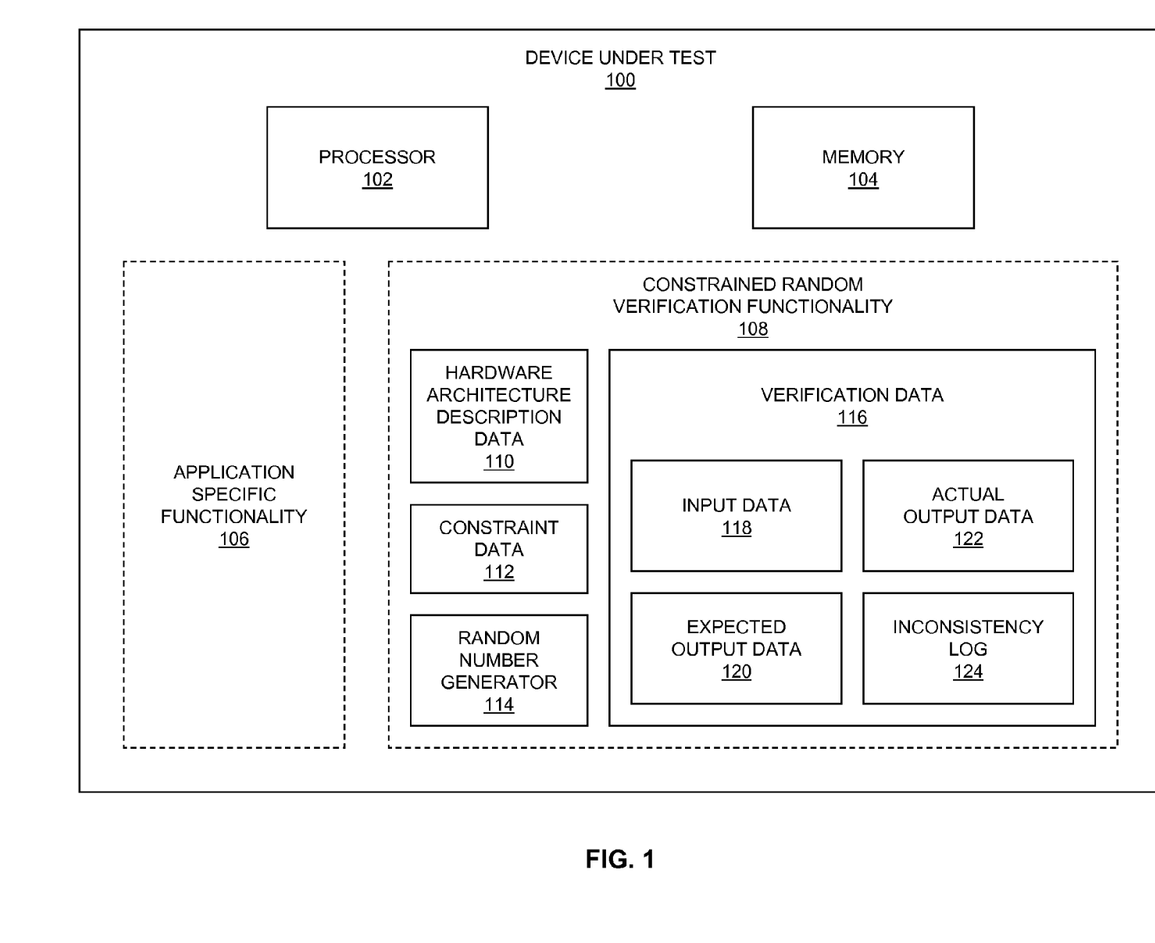
FIG. 1 is a block diagram of one embodiment of a device under test.

FIG. 1 is a block diagram of one embodiment of a device under test ("DUT") 100. The device under test 100 is an electronic circuit, typically implemented as a printed circuit assembly ("PCA") including an Application-Specific Integrated Circuit ("ASIC") or a Field-Programmable Gate Array ("FPGA"), though it could also be implemented using other electronic circuits, such as a system-on-a-chip ("SoC") or other integrated circuit or hybrid circuit, or in a simulation environment. The device under test 100 includes a processor 102 and a memory 104. Although the device under test 100 shown in FIG. 1 includes a single processor 102 and a single memory 104, other implementations of the device under test 100 include multiple processors and memory, among additional elements.

In some examples, the processor 102 is configured to execute program instructions stored in the memory 104. The program instructions, when executed by the processor 102, carry out at least a portion of the functionality described here as being performed by the device under test 100. The processor 102 includes and/or is coupled to the memory 104 for storing the program instructions and/or data used during execution of the program instructions. Examples of the memory 104 include volatile memory devices such as random-access memory ("RAM"), registers included within the processor 102, non-volatile RAM or FLASH memory, as well as mass storage devices such as magnetic disc drives and optical disc drives. In some implementations, a program-product is used. The program-product is a processor-readable storage medium on which the program instructions are embodied (that is, stored) and from which the program instructions are read by the processor 102 for execution thereby.

The device under test 100 is configured to implement at least two functionalities—an application specific functionality 106 and a constrained random verification functionality 108. The application specific functionality 106 is configured to operate the device under test 100 according to the designed usage of the device under test 100. In some embodiments, the application specific functionality 106 relates to data storage, data transfer, data manipulation, data display, data presentation, etc. In some examples the application specific functionality 106 is implemented through program instructions stored in the memory 104 and executed on the processor 102. In other embodiments, other electrical circuit parts implement the application specific functionality 106.

The constrained random verification functionality 108 implements the constrained random verification of the device under test 100. In some embodiments, the constrained random verification functionality 108 is implemented through program instructions stored in the memory 104 and executed on the processor 102. In some implementations, the processor 102 has a plurality of cores and the application specific functionality 106 is implemented using at least one core, while the constrained random verification functionality 108 is implemented using at least one other core.

During operation of the constrained random verification functionality 108, random verification tests are automatically created based on the hardware architecture description of the device under test 100 and at least one constraint. The hardware architecture description of the device under test 100 is stored in the device under test 100 (for example, in memory 104). The hardware architecture description of the device under test 100 is also referred to here as the "hardware architecture description data" 110. The hardware architecture description data 110 typically includes information about the input and output ports of the data model and the designed manipulation of data between the input and output ports for the electronic circuit. The hardware architecture description data 110 also includes information describing the various components of the device under test 100, such as those described below with regard to FIG. 3 or other discrete, integrated, or hybrid components. Data about the at least one constraint is also stored on the device under test (for example, in memory 104). This data is also referred to here as "constraint data" 112. The constraint is configured to constrain the boundaries of the created verification tests. Typically, there is more than one constraint included in the constraint data 112, though some implementations only have one constraint. As used here, "automatically" means to be performed using electronic circuits without requiring human input or intervention.

In other embodiments, the hardware architecture description of the device under test 100 and/or the at least one constraint are stored in other ways, received by the processor 102 executing the program instructions, or embodied in the constrained random verification functionality 108.

The constrained random verification functionality 108 uses a random number generator 114 to create random stimulus for a set of random verification tests. The random number generator 114 typically generates pseudorandom numbers based on a clock in processor 102 or by using an external stimulus. The constrained random verification functionality 108 creates the set of random verification tests using the hardware architecture description data 110, the constraint data 112, and pseudorandom stimulus from the random number generator 114 and stores the set of random verification tests on the device under test 100 (for example, in memory 104). Data describing various aspects of such tests are referred to here as "verification data" 116. For each random verification test created, the verification data 116 includes an input data 118 and an associated expected output data 120. The input data 118 contains, for each random verification test created, the test data used as an input for testing the device under test 100, while the expected output data 120 contains, for each random verification test created, the expected output from the device under test 100 given the associated input data 118 as an input. The input for each individual test is associated with the expected output from the individual test. In some implementations, the verification data 116 is stored using a database that, for each individual test, relates the input included in the input data 118 with the associated expected output included in the expected output data 120 for that individual test. The creation of the random verification tests by the constrained random verification functionality 108 of the device under test 100 is discussed in detail below.

After the constrained random verification functionality 108 automatically creates the random verification tests and stores them in the verification data 116, the constrained random verification functionality 108 executes the earlier created random verification tests in order to test the application specific functionality 106. The input data 118 is input into the device under test 100 while the application specific functionality 106 is operational. The application specific functionality 106 produces an actual output based on the input data 118. The actual output is stored in the actual output data 122. The execution of the earlier created random verification tests is discussed in detail below.

The actual output data 122 for each of the random verification tests is compared with the expected output data 120 for that test. This comparison between the actual output and the expected output is discussed in detail below. An inconsistency log 124 is also included in the verification data 116 stored in the memory 104 in order to keep track of any inconsistencies between the actual output data 122 and the expected output data 120.

Figure 2:
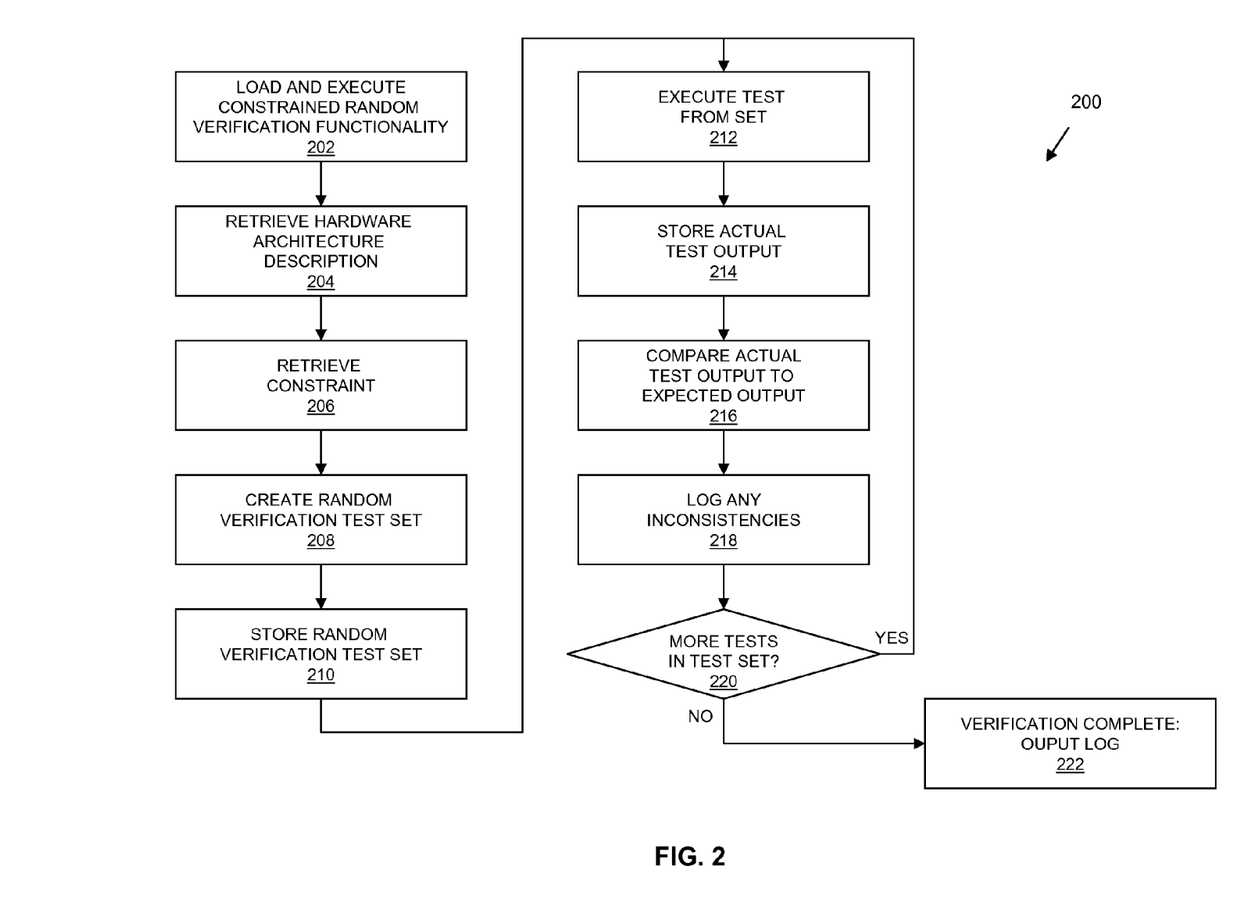
FIG. 2 is a flow diagram showing one embodiment of a method of functionally verifying the device under test of FIG. 1.

FIG. 2 is a flow diagram showing one embodiment of a method 200 of functionally verifying the device under test 100 shown in FIG. 1. The method 200 begins at block 202, where the constrained random verification functionality 108 is loaded onto the device under test 100 and executed. The method 200 proceeds to block 204, where the constrained random verification functionality 108 retrieves the hardware architecture description data 110 for the device under test 100. The hardware architecture description data 110 for the device under test 100 is typically loaded at block 202, during the loading of the constrained random verification functionality 108, or at an earlier time. In other implementations, the hardware architecture description data 110 of the device under test 100 is received from another source, such as an external storage location or an input device, such as a keyboard. Typically the hardware architecture description data 110 of the device under test 100 includes information about the interaction between low level elements of the device under test 100, such as transistors and gates, as well as high level elements of the device under test 100, such as device interfaces and other components. The hardware architecture description data 110 is used to generate appropriate random verification tests, including appropriate input data 118 and expected output data 120.

The method 200 proceeds to block 206, where the constrained random verification functionality 108 retrieves the constraint data 112. The constraint data 112 is stored at block 202, during the loading of the constrained random verification functionality 108, or at an earlier time. In other implementations, the constraint data 112 is received from another source, such as an external storage location or an input device, such as a keyboard. The constraint data 112 is used to set boundaries on the creation of the random verification tests by the constrained random verification functionality 108.

The method 200 proceeds to block 208, where the constrained random verification functionality 108 uses the hardware architecture description data 110, the constraint data 112, and random stimulus from the random number generator 114 to create a set of random verification tests to be run on the device under test 100. In other implementations, the constrained random verification functionality 108 receives information about the hardware architecture of another device and creates random verification tests to be run on the other device using the information about the hardware architecture of the other device along with at least one constraint for the other device and random stimulus from the random number generator 114. In still other implementations, the random verification tests are created on another device and the constrained random verification functionality 108 receives the random verification tests from the other device for execution thereby.

As described above, the random verification tests stored in the verification data 116 typically contain two parts—input data 118 including the test data used as an input for the testing of the device under test 100 and an expected output data 120 including the expected output from the device under test 100. The random verification tests are designed based on the hardware architecture description data 110 and the constraint data 112. The tests are designed such that the expected output data 120 contains the expected output of the application specific functionality 106 of the device under test 100 after inputting the associated input data 118 through the application specific functionality 106. The set of random verification tests created at block 208 are designed, in the aggregate, to thoroughly test the proper operation of the application specific functionality 106 of the device under test 100 according to the hardware architecture description data 110.

The method 200 proceeds to block 210, where the constrained random verification functionality 108 stores the set of random verification tests created at block 208 on the device under test 100 (for example, in memory 104). The set of random verification tests includes both the input data 118 and the expected output data 120 for each test. In other implementations, the set of random verification tests is stored in another storage medium, either internal to or external to the device under test 100.

The method 200 proceeds to block 212, where the application specific functionality 106 processes an individual random test from the set of random verification tests created at block 208. The individual random test is executed by applying the input data 118 associated with that test to the device under test 100 while it is running the application specific functionality 106. The application specific functionality 106 of the device under test 100 operates on the input data 118 and produces an associated actual output. In some implementations, the device under test 100 includes more than one application specific functionality 106, each configured to operate the device under test 100 to perform various functions.

The method 200 proceeds to block 214, where the actual test output data 122 produced by the application specific functionality 106 for that individual random test is stored. The method 200 proceeds to block 216, where the actual output data 122 for that individual test is compared to the expected output data 120 for that individual test to determine if there are any inconsistencies. An inconsistency is found anytime the actual output data 122 for an individual test does not equal the expected output data 120 for that test. The method 200 proceeds to block 218, where the constrained random verification functionality 108 saves to the inconsistency log 124 any inconsistencies found at block 216.

The method 200 proceeds to block 220, where it is determined whether there are any unexecuted individual tests in the set of random verification tests stored in the verification data 116. The constrained random verification functionality 108 typically determines that individual tests in the set of random verification tests are executed once they have associated actual output data 122. The constrained random verification functionality 108 typically determines that individual tests in the set of random verification tests are unexecuted if they do not have associated actual output data 122. If it is determined that there are any unexecuted individual tests in the set of random verification tests at block 220, the method 200 branches and returns to block 212, where another individual test from the set of random verification tests is executed. If it is determined that there are no unexecuted individual tests in the set of random verification tests at block 220, the method 200 branches to block 222, where the verification is completed and the contents of the inconsistency log 124 are typically output to the designer/tester of the device under test 100 or stored for later retrieval.

Typically, in addition to keeping track of which individual random verification tests have been run as described above, the constrained random verification functionality 108 keeps track of which individual tests have been created. Thus, the constrained random verification functionality 108 does not recreate individual tests that have already been created, nor does it rerun individual tests that have already been run. In specific implementations, the verification data 116 is stored in a database, where each entry in the database is associated with a particular test and contains the input data 118, the expected output data 120, the actual output data 122, and the inconsistency log 124 for that test. These four elements of each entry in the database are associated with one another.

In some implementations of the method 200, the processor does not create a random test set at block 208, but instead creates a single random test. In these implementations, the entire method 200 is typically repeated multiple times, with the constrained random verification functionality 108 creating and running individual random verification tests repeatedly, until the designer/tester decides it has been tested enough and stops the method 200. In other implementations, method 200 is implemented in other ways. While the method 200 is typically implemented on a physical device under test 100, such as an ASIC or FPGA, it is also possible that the device under test 100 is implemented in a simulation environment and the method 200 is executed on the simulated version of the device under test 100.

Figure 3:
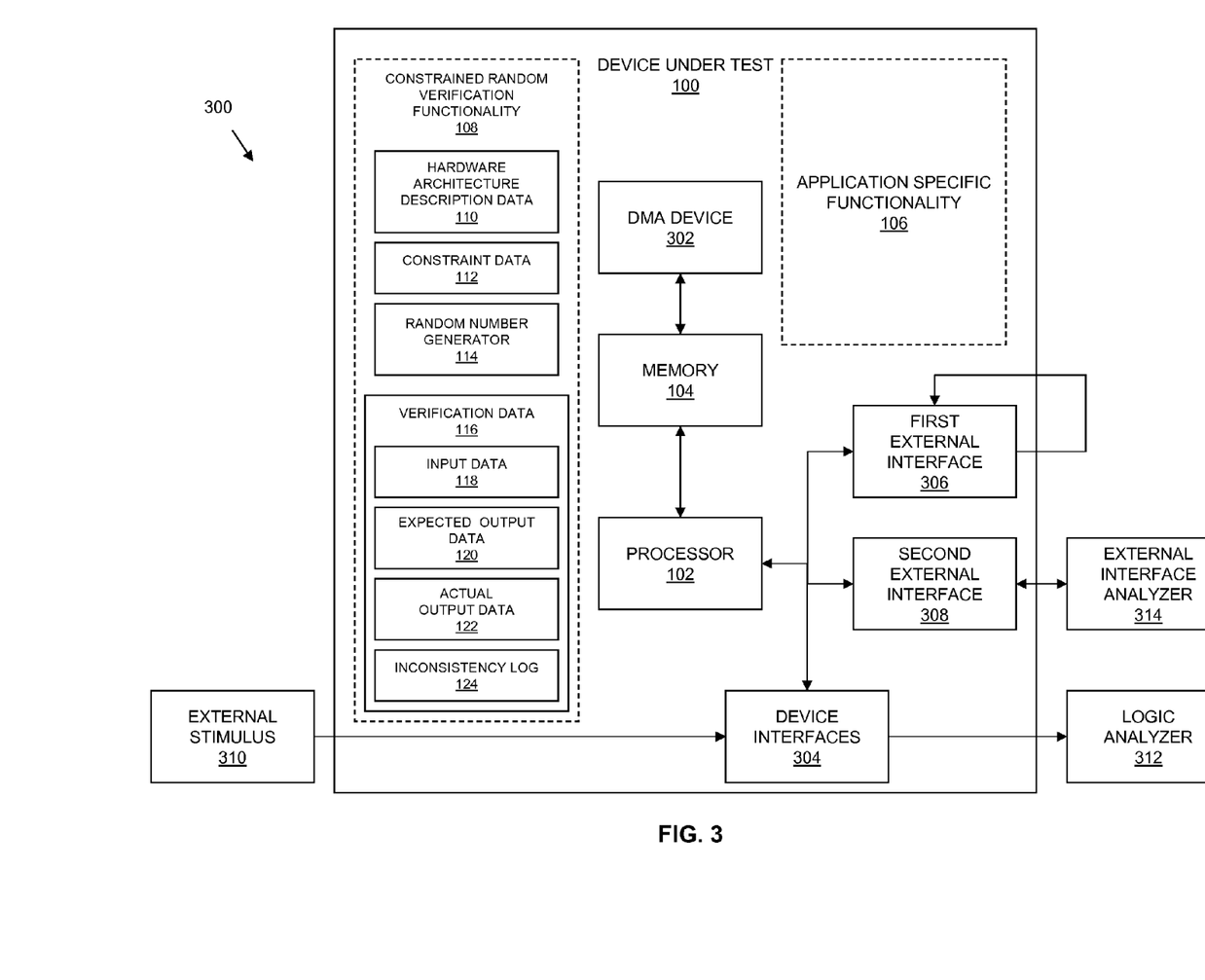
FIG. 3 is a block diagram of the device under test of FIG. 1 in an example system.

FIG. 3 is a block diagram of the device under test 100 in an example system 300. As before, the device under test 100 includes a processor 102 and a memory 104. Although the device under test 100 shown in FIG. 3 includes a single processor 102 and a single memory 104, other implementations of the device under test 100 include multiple processors and memory, among additional elements. As noted earlier, the device under test 100 is configured to implement at least two functionalities—an application specific functionality 106 and a constrained random verification functionality 108. As described above, the application specific functionality 106 is configured to operate the device under test 100 according to the designed usage of the device under test 100.

As described above, the constrained random verification functionality 108 implements the constrained random verification of the device under test 100. During operation of the constrained random verification functionality 108, random verification tests are automatically created based on the hardware architecture description data 110, the constraint data 112, and random stimulus from the random number generator 114. The creation of the random verification tests by the constrained random verification functionality 108 of the device under test 100 is discussed in detail above.

After the constrained random verification functionality 108 automatically creates the random verification tests and stores them, the constrained random verification functionality 108 executes the earlier created random verification tests in order to test the application specific functionality 106. The input data 118 is input into the device under test 100 while the application specific functionality 106 is operational. The application specific functionality 106 produces an actual output based on the input data 118. The actual output is stored in the actual output data 122. The execution of the earlier created random verification tests is discussed in detail above.

The actual output data 122 for each of the random verification tests is compared with the expected output data 120 for that test. This comparison between the actual output and the expected output is discussed in detail below. An inconsistency log 124 is also included in the verification data 116 stored in the memory 104 in order to keep track of any inconsistencies between the actual output data 122 and the expected output data 120.

In addition to the elements described with respect to FIG. 1 above, the device under test 100 shown in FIG. 3 includes a direct memory access ("DMA") device 302, device interfaces 304, a first external interface 306, and a second external interface 308. These elements, and any other elements of the device under test 100, are used by the application specific functionality 106 and are tested by the constrained random verification functionality 108. The DMA device 302 is configured to directly access the memory 104 without the processor 102 as an intermediary. The DMA device 302 is typically used in the application specific functionality 106 of the device under test 100. The device interfaces 304 typically include appropriate device interfaces for coupling with external devices, such as digital to analog converters and analog to digital converters.

The processor 102, the memory 104, the DMA device 302, the device interfaces 304, the first external interface 306, the second external interface 308, and any other components of the device under test 100 are described in the hardware architecture description data 110. The interaction between various elements of the device under test 100 is also described in the hardware architecture description data 110. The constrained random verification functionality 108 typically uses the hardware architecture description data 110 and the constraint data 112 to develop a set of constrained random verification tests designed to verify the entire device under test 100, including the processor 102, the memory 104, the DMA device 302, the device interfaces 304, the first external interface 306, the second external interface 308, and the interaction between these elements in the application specific functionality 106.

In addition to the device under test 100, the system 300 includes an external stimulus 310, a logic analyzer 312, and an external interface analyzer 314, which aid in the verification of the device under test 100. The external stimulus 310 is typically used in the application specific functionality 106 of the device under test 100. Typically, the external stimulus 310 is connected to one of the device interfaces 304, such as an analog to digital converter. During constrained random verification of the device under test 100, the external stimulus 310 is fed into one or more of the device interfaces 304. The logic analyzer 312 is typically used by hardware designers and testers to verify the proper operation of the device under test 100. Typically, the logic analyzer 312 is connected to one or more of the device interfaces 304, such that the hardware designers and testers can analyze signals in the device under test 100.

The first external interface 306 is designed to provide an external loop back from the device under test 100 back to the device under test 100. In some implementations, the first external interface 306 is a serial interface capable of sending and receiving messages. Typically, a first port of the first external interface 306 is configured to send, while a second port of the first external interface 306 is configured to receive. The first port is coupled to the second port with a cable, such that the second port receives back what the first port sends. Proper operation of this loopback is typically tested using some of the tests from the set of random verification tests at block 212 of the method 200. The second external interface 308 of the device under test 100 is configured to provide an output to the external interface analyzer 314. The external interface analyzer 314 is typically configured to receive signals from the second external interface 308. Thus, the external interface analyzer 314 aids in the verification of the application specific functionality 106 of the device under test 100.

Figure 4:
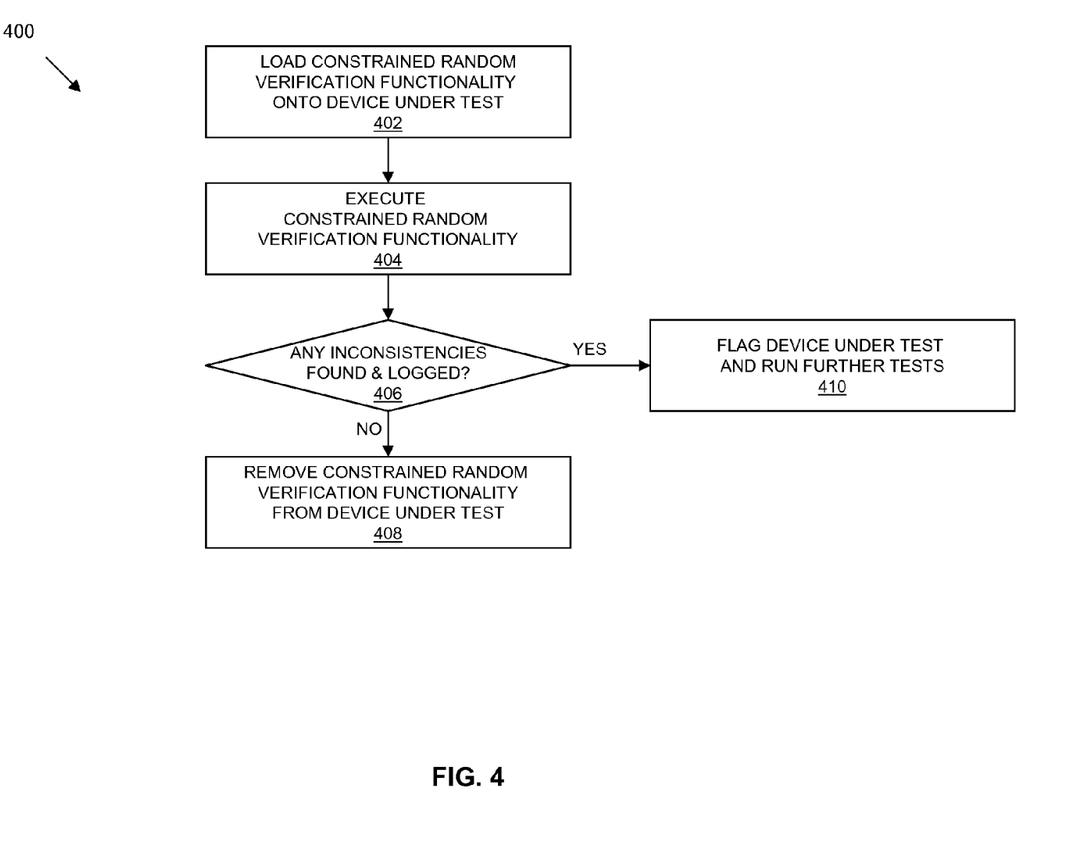
FIG. 4 is a flow diagram showing one embodiment of a method of temporarily loading and executing a constrained random verification functionality on the device under test of FIG. 1.

FIG. 4 is a flow diagram showing one embodiment of a method 400 of temporarily loading and executing the constrained random verification functionality 108 on the device under test 100. The method 400 begins at block 402, where the constrained random verification functionality 108 is loaded onto the device under test 100. In some embodiments, the constrained random verification functionality 108 is loaded into the memory 104, while in other embodiments it is loaded into other places on the device under test 100. The constrained random verification functionality 108 can be loaded from an external medium via a firmware upgrade or installed in another manner.

The method 400 proceeds to block 404, where the constrained random verification functionality 108 is executed to functionally verify the device under test 100 according to the method 200 described above. After the method 200 described above completes, the method 400 proceeds to block 406, where it is determined whether any inconsistencies were found and stored in the inconsistency log 124 at block 218 of the method 200. If no inconsistencies were found and stored at block 218 of the method 200, then the method 400 proceeds to block 408, where the constrained random verification functionality 108 is removed from the memory 104. The constrained random verification functionality 108 is typically removed by upgrading the firmware of the device under test 100 to a firmware devoid of the constrained random verification functionality 108. In other implementations, the constrained random verification functionality 108 is removed through an uninstallation or other suitable process.

If it is determined at block 406 that any inconsistencies were found and stored in the inconsistency log 124 at block 218 of the method 200, then the method 400 proceeds to block 410, where the device under test 100 is flagged as having inconsistencies and further tests are run. In some implementations, the method 400 is used to verify the device under test 100 during the design stage, in either a physical or simulated device. In other implementations, the method 400 is used to test each individual device for quality control during the manufacturing process after the device under test 100 has been verified.

A number of embodiments of the invention defined by the following claims have been described. Nevertheless, it will be understood that various modifications to the described embodiments may be made without departing from the spirit and scope of the claimed invention. Additionally, features shown and described with reference to one embodiment can be combined with or replace features shown in other embodiments. Aspects and limitations described in any specific embodiment are combinable with other embodiments. Accordingly, other embodiments are within the scope of the following claims.

What is claimed is:

1. A method of functionally verifying a device under test having at least one processor and at least one memory, the method comprising:
creating verification data for the device under test using a constrained random verification data creation process executed on the at least one processor, the verification data including input data and expected output data;
storing the verification data in the at least one memory;
executing application specific functionality on the device under test using the input data as an input, wherein executing the application specific functionality occurs at least in part on the at least one processor on which the constrained random verification data creation process was executed, wherein executing the application specific functionality results in actual output data based on the input data;
comparing the actual output data to the expected output data; and
when the actual output data does not equal the expected output data, storing at least one inconsistency between the actual output data and the expected output data.

2. The method of claim 1, wherein the application specific functionality includes instructions for operating the device under test according to a particular design.

3. The method of claim 1, wherein when the actual output does not equal the expected output portion, the at least one inconsistency is stored in at least one of the at least one memory and another storage medium external to the device under test.

4. The method of claim 1, wherein the method is continuously repeated.

5. The method of claim 1, wherein the device under test is a physical device.

6. The method of claim 1, wherein the device under test is a simulated device.

7. The method of claim 1, wherein the device under test comprises at least one of:
a printed circuit assembly;
an application-specific integrated circuit; and
a field-programmable gate array.

8. The method of claim 1, wherein comparing the actual output data to the expected output data occurs on the at least one processor on which the constrained random verification data creation process was executed.

9. A device under test comprising:
at least one processor; and
at least one memory communicatively coupled with the at least one processor, wherein the at least one processor executes a first set of instructions stored in the at least one memory, the first set of instructions configured to perform the following method:
creating verification data for the device under test using a constrained random verification data creation process executed on the at least one processor, the verification data including input data and expected output data;
storing the verification data in the at least one memory;
executing application specific functionality on the device under test using the input data as an input, wherein executing the application specific functionality occurs at least in part on the at least one processor on which the constrained random verification data creation process was executed, wherein executing the application specific functionality results in actual output data, based on the input data, for comparing to the expected output data for determining when the actual output data does not equal the expected output data.

10. The device of claim 9, wherein the method is continuously repeated.

11. The device of claim 9, wherein creating the verification data for the device under test includes creating a plurality of sets of input data and corresponding expected output data;
wherein executing application specific functionality on the device under test using the input data as an input includes applying the plurality of sets of input data to application specific functionality of the device under test to produce actual output data corresponding to the sets of input data and corresponding expected output data; the method further comprising:

comparing the actual output data to the corresponding expected output data; and when the actual output data does not equal the corresponding expected output data, storing at least one inconsistency between the actual output data and the corresponding expected output data.

12. The device of claim 9, wherein the processor executes a second set of instructions stored in the at least one memory, the second set of instructions configured to perform the following method:

removing the first set of instructions from the at least one memory; and configuring the device under test to perform the application specific functionality.

13. The device of claim 9, wherein the device is simulated in software.

14. The device of claim 9, wherein the device comprises at least one of:

a printed circuit assembly;

an application-specific integrated circuit; and a field-programmable gate array.

15. The device of claim 9, wherein the verification data is stored in a database including the input data, the expected output data, the actual output data, and an inconsistency log, wherein the at least one inconsistency between the actual output data and the expected output data is stored in the inconsistency log.

16. The device of claim 9, wherein the method further comprises:

comparing the actual output data to the expected output data; and when the actual output data does not equal the expected output data, storing at least one inconsistency between the actual output data and the expected output data.

17. A program-product for performing constrained random verification on a device under test, the program-product comprising a processor-readable storage medium on which program instructions are embodied, wherein the program instructions are operable to, when executed by at least one programmable processor included in the device under test, cause the device under test to:

create verification data for the device under test using a constrained random verification data creation process executed on the at least one processor, the verification data including input data and expected output data;

store the verification data in the at least one memory; and execute application specific functionality on the device under test using the input data as an input, wherein executing the application specific functionality occurs at least in part on the at least one processor on which the constrained random verification data creation process was executed, wherein executing the application specific functionality results in actual output data, based on the input data, for comparing to the expected output data for determining when the actual output data does not equal the expected output data.

18. The program-product of claim 17, wherein the device under test is simulated in software.

19. The program-product of claim 17, wherein the device under test comprises at least one of:

a printed circuit assembly;

an application-specific integrated circuit; and a field-programmable gate array.

20. The program-product of claim 17, wherein the verification data is stored in a database including the input data, the expected output data, the actual output data, and an inconsistency log, wherein the at least one inconsistency between the actual output data and the expected output data is stored in the inconsistency log.

* * * * *